US005608597A

United States Patent [19]

Holmström et al.

[11] Patent Number: 5,608,597

[45] Date of Patent: Mar. 4, 1997

[54] SURGE ARRESTER

[75] Inventors: Göran Holmström, Sollentuna; Jan Lundquist; Håkan Wieck, both of Ludvika, all of Sweden

[73] Assignee: Asea Brown Boveri AB, Västerås, Sweden

[21] Appl. No.: 432,974

[22] Filed: May 1, 1995

[30] Foreign Application Priority Data

May 13, 1994 [SE] Sweden .................................. 9401655

[51] Int. Cl.[6] ....................................................... H02H 1/00

[52] U.S. Cl. .............................................. 361/127; 361/126

[58] Field of Search ..................................... 361/127, 126, 361/117

[56] References Cited

U.S. PATENT DOCUMENTS 4,100,588 7/1978 Kresge ..................................... 361/127

4,656,555 4/1987 Raudabaugh ............................ 361/117

4,812,944 3/1989 Eberhard et al. ....................... 361/127

FOREIGN PATENT DOCUMENTS 0230103 7/1987 European Pat. Off. .

0335480 10/1989 European Pat. Off. .

*Primary Examiner*—Jeffrey A. Gaffin

*Assistant Examiner*—Sally C. Medley

*Attorney, Agent, or Firm*—Watson Cole Stevens Davis, P.L.L.C.

[57] ABSTRACT

A surge arrester includes a stack of varistor blocks (10), for example of zinc oxide, arranged between two end electrodes (11, 12) in an elongated insulating casing (23) of polymeric material, for example silicone rubber. The varistor blocks and the electrodes are axially surrounded by compression loops (14–17) of insulating material for providing the necessary contact pressure between the different elements (10, 11, 12) in the varistor stack. The varistor stack (10) and the compression loops are radially surrounded by a bursting-preventive bandage (21) of insulating material with openings (22) for pressure relief in case of internal short circuit in the surge arrester.

11 Claims, 3 Drawing Sheets

SURGE ARRESTER

TECHNICAL FIELD

The present invention relates to a surge arrester comprising a stack of a plurality of cylindrical varistor blocks, preferably of metal oxide, which are arranged end-to-end in the axial direction of the varistor blocks between two end electrodes and surrounded by an elongated, electrically insulating outer casing of rubber or other polymeric material. To provide the necessary contact pressure between the different elements in the stack, the arrester is provided with one or more compression members extending between the two end electrodes and being secured thereto.

BACKGROUND ART

Surge arresters of the above-mentioned kind are previously known from U.S. Pat. No. 4,656,555 and European Patent publication No. 0 230 103. One drawback in these known designs is that if, for example in case of a fault on a varistor block, an arc is produced inside the arrester with an ensuing increase in pressure, parts of the arrester may spread in an explosive manner which is harmful to the environment. Attempts to solve the problem have been made by means of a cross-wound cage, arranged around the arrester stack, with openings for pressure relief (European Patent Publication No. 0 335 480), but this renders the manufacture more complicated and more expensive.

SUMMARY OF THE INVENTION

The object of the present invention is to provide a surge arrester of the above-mentioned kind which has better short-circuit performance than the above-mentioned prior art designs by being able to withstand an electrical/thermal breakdown of the varistor stack without mechanically falling apart. In addition, it should also be relatively simple in construction and be capable of being manufactured in a cost-effective way.

This is achieved according to the invention by a design wherein the surge arrester includes a stack of a plurality of cylindrical varistor blocks of metal oxide which are arranged end-to-end in their axial direction between two end electrodes, an elongated, electrically-insulating outer casing of rubber (or other polymeric material) surrounds the blocks, one or more compression members for providing the necessary contact pressure between the blocks and end electrodes interconnects the electrodes, and a burst-preventing bandage of insulating material with openings for pressure relief in case of an internal short circuit radially surrounds the stack.

The contact-pressure generating compression members may advantageously be in the form of loops wound of glass-fibre wire and embedded in polymer, for example as shown in the non-prepublished German patent application P 43 06.691.1. The bursting-preventive bandage according to the invention may then suitably consist of fibre-reinforced rings outside the glass-fibre loops. The rings may be connected to the loops or be free. The width of the rings, that is their axial extent, may, for example, be between 10 and 50 mm, but should preferably be smaller than the height of the varistor blocks. The thickness of the rings may suitably be 2–5 mm. The rings are placed in axially spaced relationship to each other along the varistor stack, such that annular openings for pressure relief, which may have a width of 5–50 mm, are formed between them. The rings should be placed such that the openings will be positioned exactly opposite to the joints between adjacent varistor blocks. This results in faster pressure relief at those points where the risk of arcing is greatest, and hence reduced stress on the rings.

With a substantially square shape, the elasticity of the rings for radial mechanical stress may be increased compared with a circular shape, whereby the rings may withstand a greater mechanical effect. By embedment in silicone rubber or some other elastomer, part of the energy is taken up as shearing energy in the elastomer. Alternatively, the rings may be constructed with a circular shape, but will then have to be more heavily dimensioned.

Instead of rings, the bursting-preventive device may be made as a spiral arranged in the form of a helical line around the varistor stack and the compression members.

The material in the rings or the spiral may be continuously wound glass fibre. For higher mechanical performance, aramide fibre may be used. Aramide fibre can take up a higher specific load and greater deformation than glass fibre.

BRIEF DESCRIPTION OF THE DRAWINGS

The invention will be explained in greater detail by description of embodiments with reference to the accompanying drawings, wherein.

DESCRIPTION OF THE PREFERRED EMBODIMENTS

Figure 1:
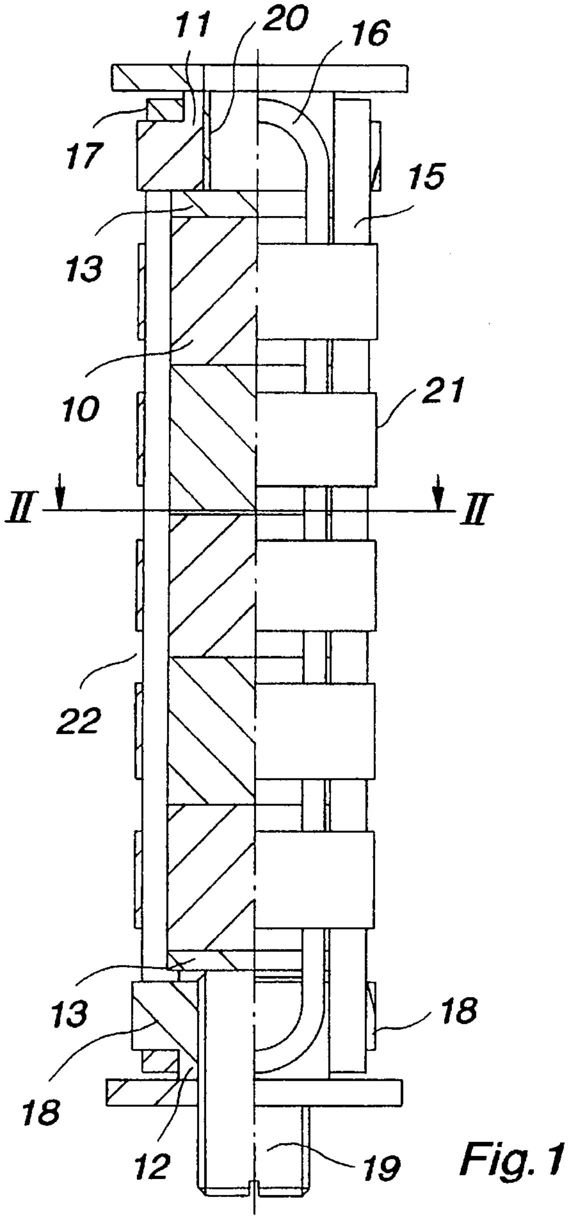
FIG. 1 is a side view, half shown as a section, of a first embodiment of a surge arrester module designed according to the invention.
Figure 2:
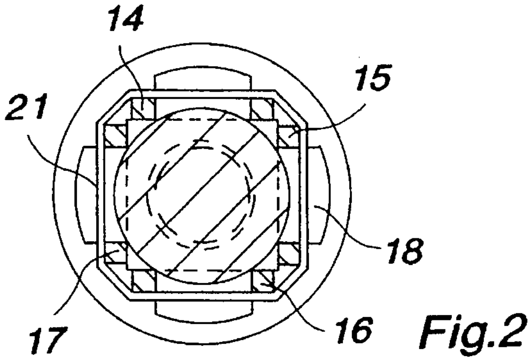
FIG. 2 is a cross section along the line II—II in FIG. 1.

The surge arrester module shown in FIGS. 1 and 2 comprises a stack of five varistor elements 10 in the form of circular-cylindrical blocks of zinc oxide (ZnO). The varistor stack is clamped between an upper and a lower end electrode 11 and 12, respectively, with intermediate pressure plates 13. The end electrodes and the pressure plates may suitably be made of aluminium. The axial compression of the varistor stack is achieved by means of four electrically-insulating compression loops 14, 15, 16, 17, which are wound from continuous glassfibre wire with many turns and embedded in thermosetting resin. The compression loops 14–17 are clamped to the end electrodes 11, 12, which for this purpose are provided with four radially-projecting shoulders 18 with circular-cylindrical contact surfaces. The loops may be prefabricated and then be clamped to the stack composed of varistor blocks and electrodes by tightening a bolt 19 which is screwed into the lower end electrode 12 and which at the same time serves as a jointing bolt or end connection. Alternatively, the necessary contact pressure may be provided by winding the glass-fibre wire with prestress direct onto the assembled stack. The upper end electrode 11 of the arrester module is provided with a threaded hole 20 for a bolt for joining (series connection) to an identical module or for external connection.

In order to prevent the arrester module from mechanically falling apart in the event of an electrical/thermal failure of the varistor stack, the module is provided with a bursting-preventive device consisting of five fibre-reinforced rings 21 which radially surround the varistor stack and the glass-fibre loops. The rings 21 are substantially of square shape and are placed in axially spaced relationship to each other along the stack, such that annular openings 22 for pressure relief, in the event of arrester failure, are formed between them. The openings are located exactly opposite to the joints between adjacent varistor blocks.

An arrester module of the design shown in FIG. 1 may have a length of, for example, 10–100 cm. It may on its own constitute the active part in surge arresters for system voltages of up to 72 kV or be built together with additional modules for forming arrester units for system voltages of up to, for example, 145 kV. These, in turn, may be built together with additional such units for achieving surge arresters for higher system voltages, for example 245 kV and 362 kV. The arrester units are provided with a casing, cast onto the arrester units, preferably of an elastomer, for example silicone rubber or ethylene propylene terpolymer (EPDM rubber).

Figure 3:
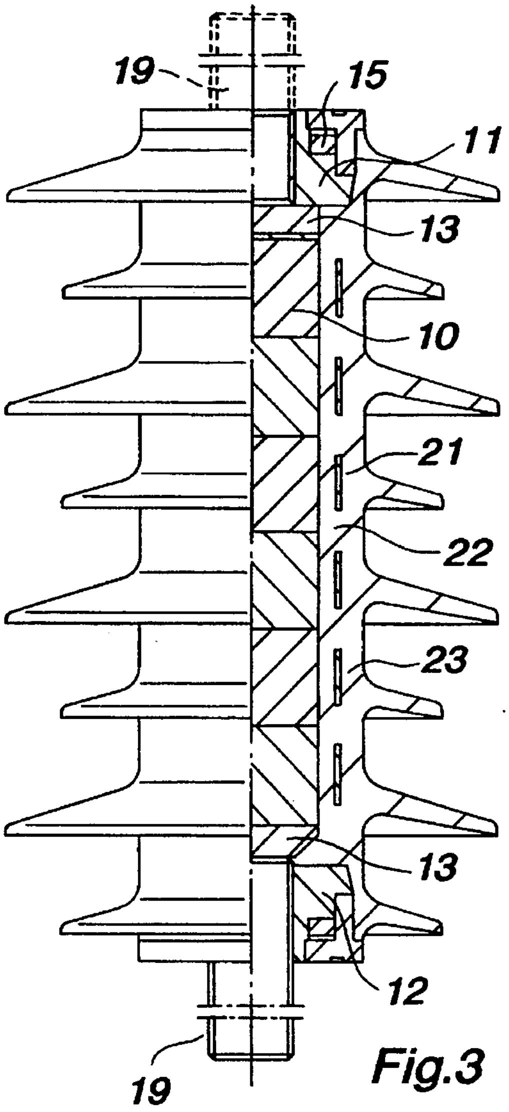
FIG. 3 is a side view, half shown as a section, of a surge arrester, the interior of which is constructed, in principle, as shown in FIGS. 1 and 2.
Figure 4:
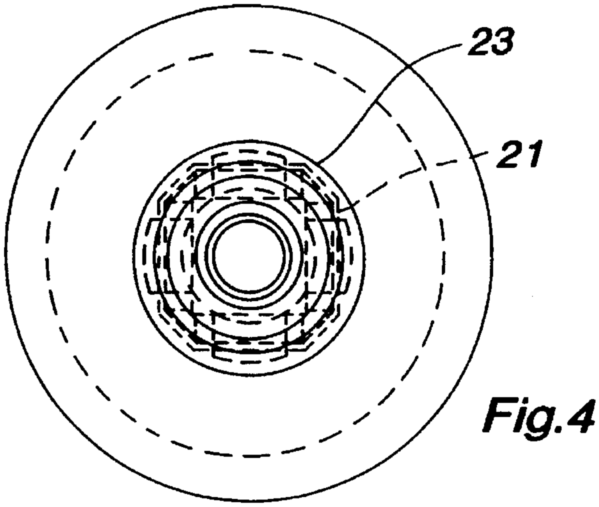
FIG. 4 shows the surge arrester according to FIG. 3 in an end view.

FIGS. 3 and 4 show a finished surge arrester consisting of an inner part, which comprises six varistor blocks 10 and is built up as described with reference to FIGS. 1 and 2, and a casing 23 of the kind described above which is cast onto the inner part.

Figure 5:
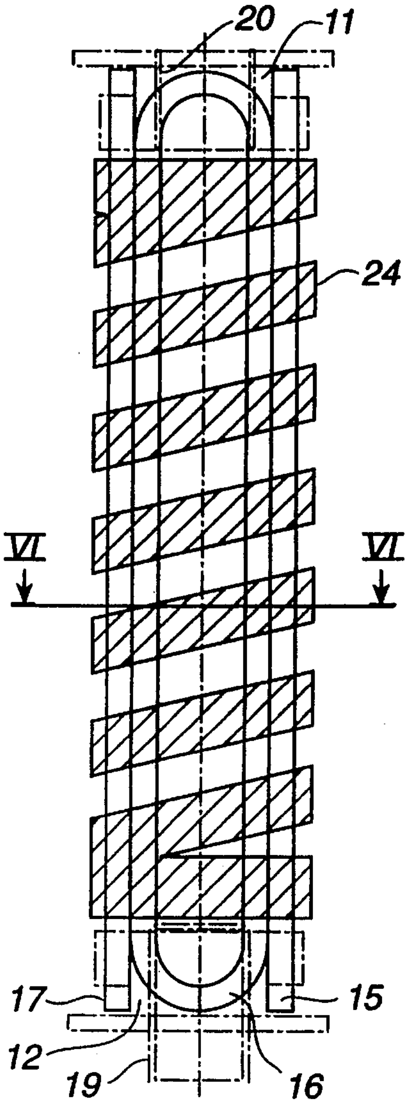
FIGS. 5 and 6 show a second embodiment of a surge arrester module designed according to the invention, FIG. 5 being a side view and FIG. 6 a cross section along the line VI—VI in FIG. 5, and FIGS. 7 and 8 show in a corresponding way a third embodiment of such a surge arrester.
Figure 7:
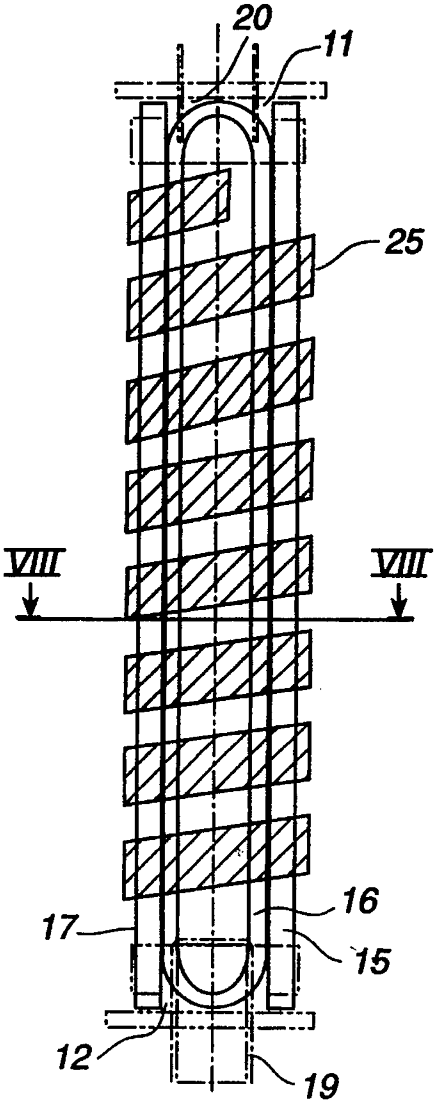
Figure 6:
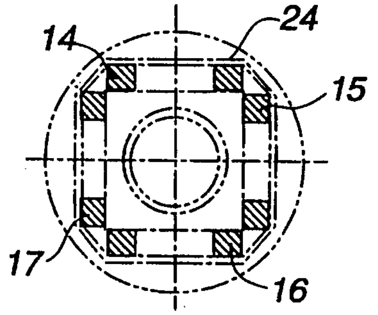
Figure 8:
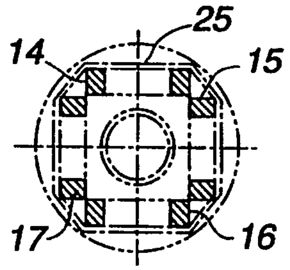

Instead of a bursting-preventive device in the form of rings, the device may consist of a spiral arranged in the form of a helical line around the varistor stack and the compression loops. FIGS. 5 and 6 show an arrester module with such a spiral 24 with closed ends, whereas FIGS. 7 and 8 show an arrester module with a spiral 25 with open ends. An open spiral has the advantage of providing simpler mounting, whereas a closed spiral provides higher strength. Compared with the rings, the spiral shape provides greater deflection in case of inner radially mechanical impact load. The deflection is prevented by the outer vulcanized elastomer casing by a greater part of the elastomer taking up the deformation energy.

We claim:

1. A surge arrester comprising:

(a) a stack of a plurality of cylindrical varistor blocks of metal oxide, said varistor blocks being arranged end-to-end in their axial direction between two end electrodes;

(b) an elongated, electrically-insulating outer casing of rubber or other polymeric material surrounding said stack;

(c) at least one compression member of insulating material interconnecting said end electrodes for providing contact pressure between said varistor blocks and said end electrodes; and (d) a bursting-preventive bandage radially surrounding said varistor stack, said bandage consisting of a continuously wound insulating fibre embedded in thermosetting resin and having openings for pressure relief in case of internal short circuit in the surge arrester.

2. A surge arrester according to claim 1, wherein also said compression members (14–17) are radially surrounded by said bursting-preventive bandage (21).

3. A surge arrester according to claim 1, wherein said bandage (21) consists of a plurality of rings arranged in axially spaced relationship to each other along the varistor stack.

4. A surge arrester according to claim 3, wherein said rings (21) have an axial extent which is smaller than the thickness of the varistor blocks (10) and are placed such that the pressure-relief openings (22) lie on a level with the joints between adjacent varistor blocks (10).

5. A surge arrester according to claim 4, wherein said rings (21) are non-circular.

6. A surge arrester according to claim 5, wherein said rings (21) are substantially square.

7. A surge arrester according to claim 1, wherein said bandage (21) consists of a spiral (24, 25) arranged in the form of a helical line around the varistor stack.

8. A surge arrester according to claim 1, wherein said compression members (14–17) consist of at least one compression loop which axially surrounds the varistor blocks (10) and the electrodes (11, 12).

9. A surge arrester according to claim 8, wherein said compression loop (e.g. 14) consists of a multi-turn winding, embedded in thermosetting resin, of electrically insulating fibres, for example glass or aramide fibre.

10. A surge arrester according to claim 1, wherein said insulating fibre is a glass fibre.

11. A surge arrester according to claim 1, wherein said insulating fibre is an aramide fibre.

* * * * *